Figure 1:
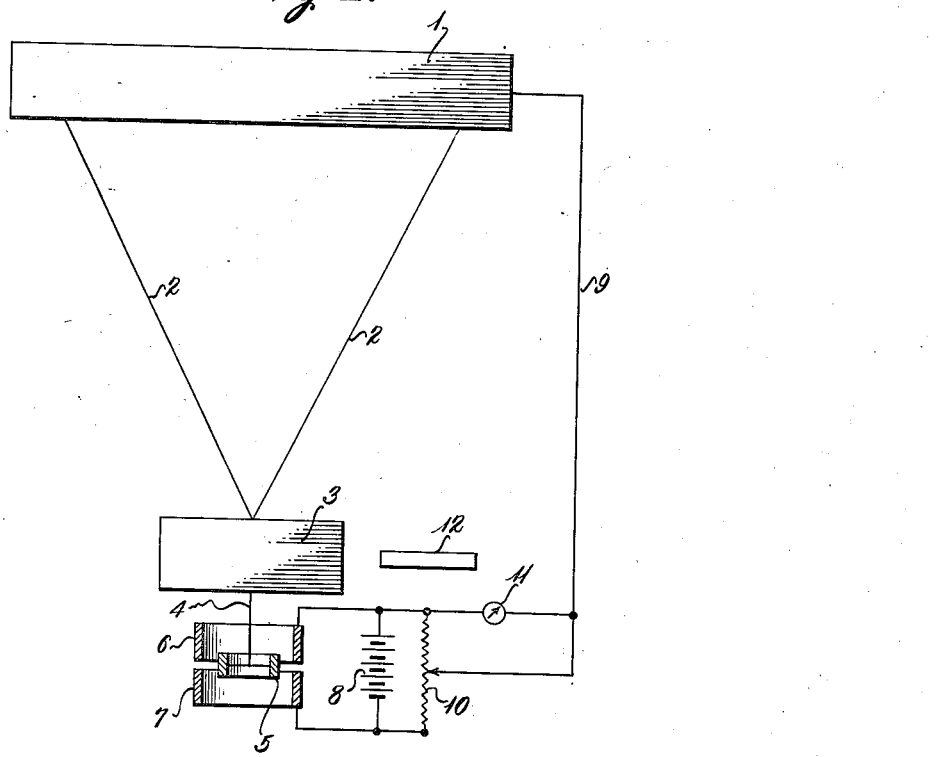

May 27, 1941. D. H. CLEWELL 2,243,749
GRAVITY METER
Filed Feb. 21, 1940

Inventor
Dayton H. Clewell
By
Dallas R. Lamont
Attorney

Patented May 27, 1941

2,243,749

UNITED STATES PATENT OFFICE 2,243,749

GRAVITY METER

Dayton H. Clewell, Dallas, Tex., assignor, by mesne assignments, to Socony-Vacuum Oil Company, Incorporated, New York, N. Y., a corporation of New York Application February 21, 1940, Serial No. 320,056

3 Claims. (Cl. 265—1.4)

This invention relates to means for performing geophysical explorations by measuring the relative gravitational forces which the earth exerts at various locations. More particularly, this invention relates to a particular means whereby a resiliently supported mass may be brought to the same position relative to the support regardless of small differences in gravitational attraction occasioned by changes in the location of the instrument, and the force required to bring the mass to the same relative position may be measured as a measure of the difference in gravitational attraction.

Prior to this invention a large number of gravity meters of various types have been proposed and many have gone into actual use. Most of these have consisted of resiliently supported masses and arrangements for noting the position of the mass relative to the support so that any change in its position due to a change in the gravitational force affecting it could be noted. In a general way these devices may be considered to be refinements of the commonly used spring balance. Obviously, however, the refinements have been highly complicated since it is necessary to make the device far more sensitive and compensate for or exclude errors due to temperature changes, fatigue in materials, stretching of supporting wires, and the like.

In addition to these complicating factors, which make accurate determination of gravity difficult, but not impossible, it has also been found that when a mass is supported by an elastic or resilient supporting means, and the mass then goes upward or downward, due to a change in the gravitational pull upon it, the reaction of the resilient supporting means on the mass changes not in a single ratio to the movement of the mass but in a complicated way that is quite difficult to determine or compute. This is due, at least in part, to the fact that the supporting means is nearly always used under peculiar conditions to make it unusually sensitive to small changes in gravitational force. Therefore, when a measurement is made at one locality and a zero or base point established for the position of the mass, and the instrument is subsequently moved to another locality where it is found that the mass comes to rest in a different position, it is usually almost impossible to ascertain or compute the actual difference in the gravitational force which causes the displacement.

Attempts have already been made to avoid this difficulty by bringing the mass back to a fixed position at each location and measuring the amount of force necessary to bring the mass back to that position. This avoids the necessity of having to calculate the amount of force that causes a certain deflection of a complicated resilient support for a gravity meter mass. Difficulty has been encountered, however, in finding a way to apply force to a gravity meter mass in such a way that the force can be small enough to balance the gravitational difference and yet can be measured. Attempts to accomplish the results electromagnetically have not been entirely satisfactory partly because of the extremely small forces that it is desired to apply and the fact that the current necessary to apply such a force must necessarily be so small as to make measurement extremely difficult.

Confronted with this situation, the present inventor has discovered that by the use of the force exerted electrostatically between bodies at different electrical potentials he may use a relatively large voltage to apply to the gravity meter mass an extremely small force, which force is directly related to the magnitude of the voltage used, and which for that reason may be determined by determining the voltage used to produce it.

This invention may be embodied in any gravity meter of the types already known in which a mass is suspended resiliently from a support and a means is provided to observe the position of the mass. For example, from the mass of such a gravity meter, a small ring of conductive material such as copper or aluminum may be supported, and above and below this ring, or on opposite sides of it in case it becomes desirable to place it in a vertical position, may be placed a pair of fixed rings or plates, also of conductive material. Now, by placing a potential between the two fixed plates and bringing the plate carried by the gravity meter mass to a potential that may be varied between the potentials of the two fixed plates, a variable force may be exerted on the movable plate and through it on the gravity meter mass. The relative voltage of the movable plate and the fixed plates will govern the amount of force applied, but the force will be small and proportional to the voltage. Thus, by measuring the applied voltage a measurement may be had of the force necessary to bring the gravity meter mass back to a zero or base position and this force is equal to the difference in a gravitational pull on the mass at the locations in question.

Figure 2:
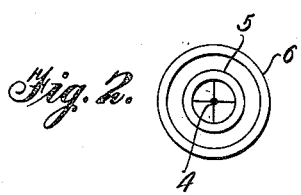
Figure 3:
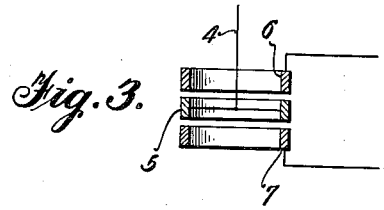

In order to more fully understand the details and advantages of the present invention, reference may be had to the drawing, in which Figure 1 is a diagrammatic illustration of the essential parts of a gravity meter embodying the present invention, Figure 2 is a detailed view showing the manner in which the movable ring sits in between the stationary ring and Figure 3 is a view similar to Figure 1 but showing only a part of the device embodying a slightly different arrangement of the fixed or stationary rings.

It will at once be apparent to those skilled in the art that many modifications of the structural details of the illustrated device may be made without departing from the spirit of the invention. For example, any other desired type of support for the gravity meter mass may be used, a conductive disc may replace any one or all of the conducting rings shown, and in fact the gravity meter mass itself may in some instances be used as the movable conductive member. The device of the drawing is shown merely for the purpose of illustrating the principles here involved and because it is one form of the invention that is known to have particular advantages, but the scope of the invention is not limited thereto.

The preferred embodiment of the invention shown in the drawing uses a type of gravity meter containing a support 1, resilient torsion elements 2 and a suspended mass 3. In the operation of this gravity meter a torsional stress is applied to the resilient elements in such a manner that the system is in a delicately balanced state and as a result the suspended mass is very sensitive to small changes in the gravitational forces acting upon it. Any change in the gravitational force causes the suspended mass to be displaced in a vertical direction and imparts to the mass a rotary screw action either up or down depending on whether the gravitational force increases or decreases.

According to the invention the change in downward force exerted by the gravity meter mass is measured by applying a balancing force to the mass which counteracts any change in the gravitational attraction and the magnitude of the force required to return the mass to or keep the mass in its original position is an exact measure of the change in the gravitational force.

In the preferred embodiment this is accomplished by suspending from the central point of the gravity meter mass by means of a conductive element 4, a non-magnetic electro-conductive segment of a cylinder 5 in such a manner that its axis is at right angles to the axis of the gravity meter mass. Two fixed rings of conductive material 6 and 7 are disposed concentrically about the segment of the cylinder and spaced from the surface of the cylindrical element 5 by small air gaps, the ring 6 being positioned above and the ring 7 being positioned below the cylinder as shown in Figure 2.

A battery 8 is connected across the two rings 6 and 7. In the arrangement shown in Figure 1, the positive pole of the battery is connected to the upper ring 6 and the negative pole to the lower ring 7 and results in the ring 6 being charged positively and ring 7 being charged negatively. This application of potential across the two rings builds up an electrostatic field between the rings and the flux which results flows from the ring 6 into the side of the cylinder 5 and out into the ring 7.

The cylindrical element 5 is not confined to a diameter smaller than the diameter of the two fixed rings and may have a diameter of the same magnitude as the fixed rings. This embodiment is shown in Figure 3.

While the cylindrical element 5 is in the field of flux supplied by the electrostatic field between the rings 6 and 7, a potential is applied to it by means of a return circuit through the gravity meter mass 3 and support 1 and the suspension elements 2 and 4. The gravity meter support 1 is connected by a lead 9 to the battery 8 through a variable resistance 10 which is connected across the battery. In this return circuit is placed a voltmeter 11 to indicate the potential applied through this circuit to the cylinder 5.

When a potential is applied to the cylinder, the flux of the field between the rings is changed and the cylinder is displaced in the direction of the greatest flux. The displacement of the cylinder follows the old theorem that like charges repel and unlike charges attract and the amount of attraction or repulsion depends upon the strength of the charges. In this case the strength of the charges on the two rings 6 and 7 remains constant while the strength of the charge on the cylinder 5 is varied by operation of the variable resistance 10.

The movement of the cylinder 5 in the electrostatic field imparts a corresponding movement to the gravity meter mass 3 and it is for this purpose that the present invention is concerned.

The relative position of the gravity meter mass and its support is observed by a viewer or hair line telescope 12 which is focused on a fiduciary mark or scale on the suspended mass.

In operation a series of locations or stations are selected and one location used as the base point for all readings. The instrument is brought into position at this base station and the position of the mass 3 observed through the telescope 12. The potential of the cylindrical element 5 is raised or lowered, depending upon the position of the mass, until the fiduciary mark on the mass is brought into the hair lines of the telescope. The potential necessary to bring the system to a balance point is recorded and used as the zero or base point for the other readings.

After the meter has been balanced at the base station it is moved to the other predetermined locations and the process is repeated, e. g. balancing the system with respect to the fiduciary mark of the suspended mass by varying the potential of the cylinder 5 so that the resulting displacement of the cylinder and the mass compensates for the change in gravitational force and brings the mass back to its zero position. The difference in the potential of the cylinder between each station is compared with the zero reading at the base station and the corresponding forces applied to the mass through the cylinder computed.

As the difference in potential is directly proportional to the force required to return the mass to or keep the mass in its original or zero position, the calculated forces are an exact measure of the changes in gravitational forces between the corresponding stations and are an indication of the relative magnitude of the gravitational force at each location.

I claim:

1. An apparatus for geophysical prospecting that comprises a support, a mass resiliently suspended from said support, means to note the relative positions of said mass and support, a conductive member fixed to said mass, stationary conductive members on opposite sides of said first-mentioned conductive member, means for applying a potential between said stationary conductive members and means for varying the potential between said first-mentioned conductive member and the two stationary conductive members, whereby an electrostatic force is exerted on said first-mentioned conductive member and through it upon said mass.

2. An apparatus for geophysical prospecting that comprises a support, a mass resiliently suspended from said support, means to note the relative positions of said mass and support, a conductive member suspended from said mass, stationary conductive members positioned on opposite sides of and concentric with said first-mentioned conductive member, means for applying a constant potential between said stationary conductive members, means for varying the potential on said first-mentioned conductive member and means for noting the potential of said first-mentioned conductive member to determine the magnitude of the resulting electrostatic force exerted on said first-mentioned conductive member and through it upon said mass.

3. An apparatus for geophysical prospecting that comprises a support, a mass resiliently suspended from said support, means to note the relative positions of said mass and said support, an electrically conductive member fixed to the mass, stationary conductive members positioned symmetrically on opposite sides of first mentioned conductive member, means for establishing an electrostatic field between said stationary members, means for varying the electrical potential of the first mentioned conductive member so as to introduce various amounts of asymmetry in the electrostatic field and thereby cause a force to act on said first mentioned conductive member and through it upon said mass, and means for noting the potential of said first mentioned conductive member.

DAYTON H. CLEWELL.